Nov. 12, 1968        E. J. SCHAEFER        3,410,617
                     THRUST BEARING
Filed June 3, 1966                          3 Sheets-Sheet 2

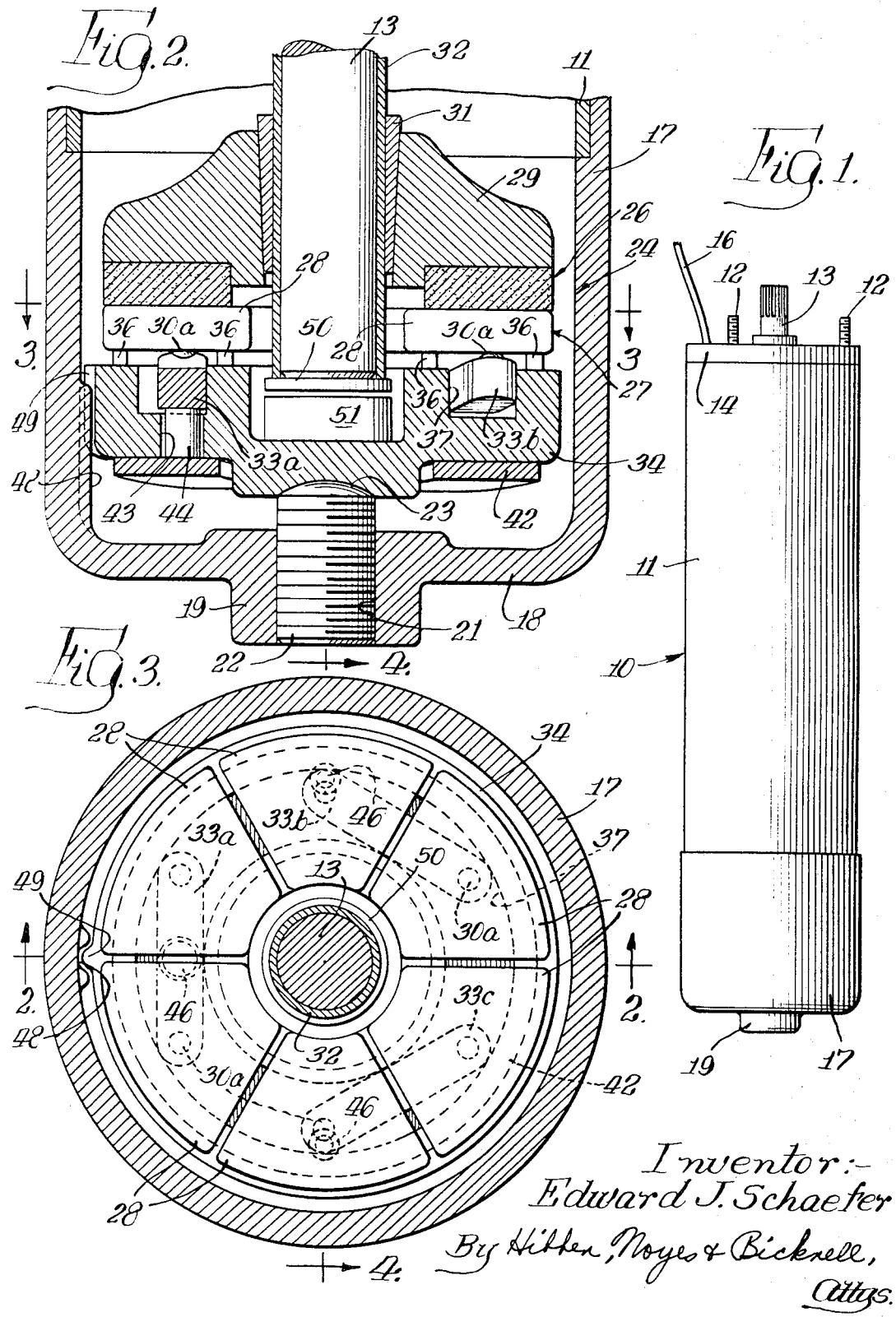

Nov. 12, 1968  E. J. SCHAEFER  3,410,617
THRUST BEARING

Filed June 3, 1966  3 Sheets-Sheet 3

United States Patent Office 3,410,617
Patented Nov. 12, 1968

3,410,617
THRUST BEARING
Edward J. Schaefer, Bluffton, Ind., assignor to Franklin Electric Co., Inc., Bluffton, Ind., a corporation of Indiana
Filed June 3, 1966, Ser. No. 555,037
10 Claims. (Cl. 308—160)

ABSTRACT OF THE DISCLOSURE

This disclosure deals with means for supporting the stationary element of a thrust bearing which also includes a rotatable element adapted to be connected to, for example, a rotatable shaft. The stationary element is mounted on a preloaded spring which deflects only when the preload is exceeded, such deflection absorbing shock overloads on the thrust bearing or stopping rotation of the shaft if the overload is prolonged. Pins may also be provided for pivotally connecting the spring and the stationary element to a bearing support.

---

Thrust bearings are commonly used where it is necessary to mount a rotating thrust imposing member on a stationary support member. A motor-pump assembly, for example, usually includes a thrust bearing which sustains the weight of the rotating parts of the assembly and the axial thrust of the pump. Where it is expected that large thrusts will be encountered, a multiple thrust bearing of the character disclosed in the copending application of E. J. Schaefer, Ser. No. 373,774, filed June 9, 1964, now Patent No. 3,326,612, issued June 20, 1967 may be provided.

In such an installation, there is always the danger that the thrust bearing may be damaged by a thrust overload, either shock or sustained, because the motor may continue to rotate in spite of the thrust overload, and thus permanently damage the bearing.

It is therefore an object of this invention to provide a novel thrust bearing which will hold a shaft axially stationary with loads up to a rated load, and will permit a relatively large axial deflection of the shaft with an overload, such deflection causing the motor to stop.

It is another object of the invention to provide a thrust bearing which will absorb shock thrust loads.

Still a further object is to provide a relatively large capacity multiple thrust bearing including a plurality of units, and means for automatically dividing the thrust among the several units.

A still further object is to provide a multiple thrust bearing of the foregoing character which will absorb shock thrust overloads without damage to the bearing.

Still another object is to provide a thrust bearing including a novel gimbal construction for supporting the bearing.

Other objects and advantages of the invention will be apparent from the following description taken in conjunction with the accompanying drawings, in which:

FIG. 1 is an elevational view of a motor including a thrust bearing embodying the invention;

FIG. 2 is an enlarged fragmentary sectional view of the bearing, taken on the line 2—2 of FIG. 3;

FIG. 3 is a sectional view taken on the line 3—3 of FIG. 2;

Figure 4:
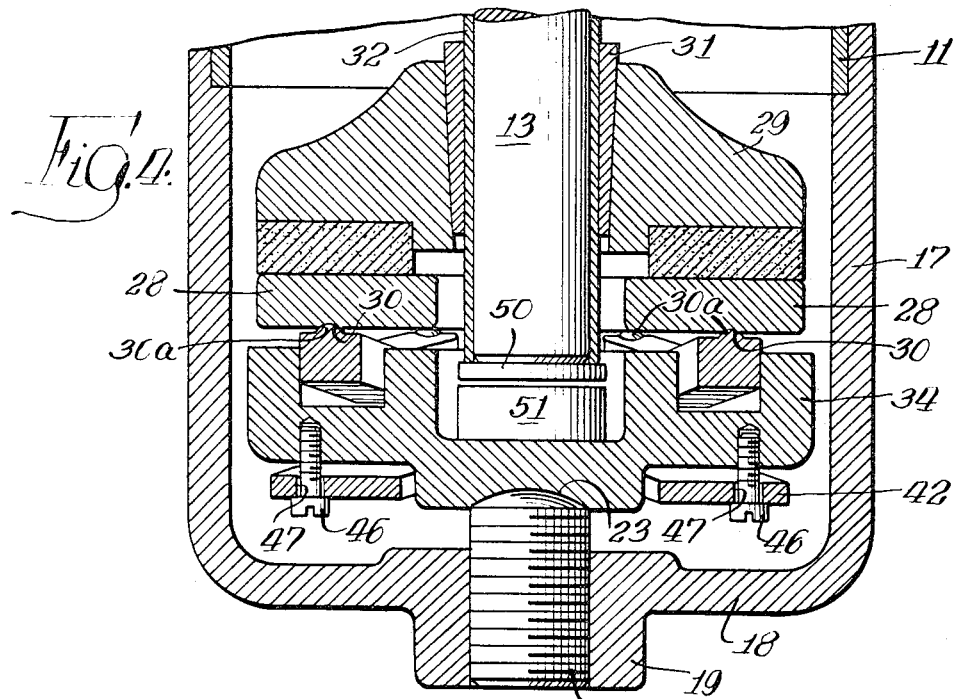
FIG. 4 is a sectional view taken on the line 4—4 of FIG. 3.

In general, a thrust bearing embodying the invention comprises at least one thrust bearing unit adapted to axially support a rotatable thrust imposing member on a non-rotatable support member. The unit comprises a rotatable element adapted to be connected to the thrust imposing member and a non-rotatable element adapted to be connected to the support member. The connection between one of said elements and its associated member is such that said one element is axially deflectable under overload thrust conditions, deflection of said one element permitting axial deflection of the thrust imposing member. Axial deflection is obtained by resiliently and pivotally connecting said one element to the associated member, and in one form of the invention, the pivotal portion of the connection comprises a novel gimbal arrangement.

A multiple thrust bearing comprising a plurality of units may be provided, the units being substantially identical. In such a multiple thrust bearing, if one thrust bearing unit becomes overloaded a slight deflection occurs which results in a transfer of the overload to another unit. If all of the units are overloaded simultaneously, all of the units deflect, which results in a substantial deflection of the thrust imposing member. Such deflection stops operation of the motor, thus preventing damage to the thrust bearing and other relatively expensive parts.

In greater detail, a thrust bearing assembly in accordance with the invention may be used, for example, in an electric motor of a submersible type. With reference to FIG 1. such a motor is indicated by the numeral 10 and comprises an outer shell or casing 11 which encloses a stator and a rotor (not shown) of the motor. At the upper end of the motor 10 is provided a plurality of upwardly extending studs 12 which are used to connect the motor 10 to, for example, a pump to be driven. The motor 10 has a rotor shaft 13 extending upwardly through an upper end bell 14 of the motor and is preferably splined for connection with the unit to be driven. An electrical cable 16 is passed through the upper end bell 14 for connecting the windings of the motor 10 to a suitable source of electric power (not shown).

At the lower end of the motor 10 is provided a bearing housing 17 (FIGS. 1 to 4) which may be secured to shell 11 of the motor 10 by suitable means. The bearing housing 17 (FIG. 2) is generally cup-shaped and has a boss 19 formed at the center of the bottom wall 18 thereof. An internally threaded hole 21 is formed through the boss 19, and an adjusting screw 22 is threaded through the hole 21. The upper end 23 of the adjusting screw 22 is rounded as shown in FIG. 2, and this rounded upper end supports a thrust bearing unit 24 which in turn supports the rotor shaft 13 of the motor 10. The bearing housing 17 thus constitutes a non-rotatable support member, and the shaft 13 of the motor 10 consitutes a thrust imposing rotatable member.

The thrust bearing unit 24 is preferably of the Kingsbury or pivoted segment type, and comprises a rotatable element 26 which is rigidly secured to the shaft 13, and a non-rotatable element 27 which is deflectably connected to the housing 17. In the present instance, the rotatable element 26 comprises a graphite disk and the non-rotatable element 27 comprises a plurality of thrust pads or segments 28 (FIG. 3). The graphite disk 26 is fastened to a thrust disk 29 which in turn is secured to the shaft 13 as by a wedge member 31. A sleeve 32 is preferably interposed between the shaft 13 and the wedge member 31 if desired.

In the present instance three pairs of thrust segments 28 are provided making a total of six segments, and the pairs of segments 28 are supported by three generally V-shaped rocker arms 33a, 33b and 33c (FIGS. 2 to 4). Each of the segments 28 has a spherical depression 30 (FIG. 4) formed in its underside at substantially its center, and semi-spherical raised portions 30a are formed on the upper surfaces of the ends of each rocker arm, the segments 28 being positioned with the depressions 30 seated on the raised portions 30a of the rocker arms. To prevent the segments 28 from rotating about the raised portions 30a of the rocker arms, vertically extending pins 36 (FIG. 2) are positioned in suitable holes formed in a stationary support disk 34 and the underside of the segments 28.

The rocker arms 33a, 33b and 33c are supported by the support disk 34 which is positioned coaxially with and below the shaft 13 and the segments 28. An annular channel 37 is formed in the upper surface of the support disk 34, and the rocker arms are positioned in the channel 37, the height of the rocker arms relative to the depth of the channel 37 being such that only the upper portions of the rocker arms appear above the upper surface of the support disk 34. The two rocker arms 33b and 33c (FIG. 3) are supported on the bottom of the channel 37 of the support disk 34, while the third rocker arm 33a is resiliently supported by a wave-type spring 42 attached to the support disk 34. A vertically extending hole 43 is formed through the support disk 34 from the bottom of the channel 37 to bottom surface of the disk 34, the hole 43 being located directly below mid-point of the V-shaped rocker arm 33a, and a pin 44 having a length somewhat longer than the length of the hole 43 extends through the hole 43. In the present instance, the wave-type spring 42 has two high points and two low points, the high points being adjacent the support disk 34 and the low points being spaced therefrom, the high and low points being located at 90° intervals. The spring 42 is secured to the under side of the support disk 34 by two bolts 46 (FIGS. 3 and 4), the bolts 46 extending through holes 47 formed through the spring 42 and into threaded holes formed in the underside of the support disk 34. As shown in FIG. 4, the holes 47 and the bolts 46 are located at the low points of the spring 42, and the bolts 46 are tightened into the holes of the support disk 34 sufficiently far to place tension or a pre-load on the spring 42. As shown in FIG. 2, the two high points of spring 42 are pressed tightly against the underside of the support disk 34, and the pin 44 rests on the upper surface of the spring 42 at one high point. However, during thrust overload conditions, sufficient pressure is exerted by the rocker arm 33a on the spring 42 through the pin 44 to cause the spring 42 to deflect.

It is preferred that the spring 42 be preloaded and that the amount of the preload be equal to the maximum safe load that may be imposed on the thrust bearing. Thus, the spring 42 will not deflect until the preload, or maximum safe load is exceeded, and it is preferred that the spring have a relatively large deflection once the preload has been exceeded. For example, if it were desired that a 10% thrust overload would deflect the spring .010 inch, then the spring 42 should be designed such that it would deflect .100 inch at the rated load. During assembly of the bearing the bolts 46 are tightened into the support disk 34 to place the preload on the spring 42, thereby deflecting the spring .100 inch. Thereafter, during operation, a thrust imposed by the shaft 13 will not cause additional deflection of the spring 42 unless the preload of the spring 42 is exceeded. A thrust in excess of the preload would of course cause the spring 42 to deflect further, and if the overload reaches 10% over the maximum load, additional deflection of the spring 42 would be .010 inch, making a total spring deflection of .110 inch.

Deflection of the spring 42 results in the downward movement of the pin 44, the rocker arm 33a and the two segments 28 supported by the arm 33a. Such downward movement of the rocker arm 33a causes pivotal movement of the support disk 34 on the adjusting screw 22 because the total load must always be equally divided between the three rocker arms 33a, 33b and 33c. If there is any tendency for the load on one of the three rocker arms to decrease, as when the spring 42 supporting the rocker arm 33a deflects and permits the arm 33a to move downwardly slightly, the support disk 34 will pivot on the adjusting screw 22 such as to move the other two rocker arms 33b and 33c downwardly to the level of the rocker arm 33a and thereby restore equalization of the load between the three rocker arms. This operation, of course, assumes that the angle of tilt of the support disk 34 relative to the axis of the adjusting screw 22 and the shaft 13 is sufficiently small that the plane of the upper surfaces of the segments 28 remains substantially the same as the plane of the rotating graphite disk 26. Since the segments 28 can pivot on the portions 30a of the rocker arms, the segments 28 may remain parallel to the disk 26 even though the disk 34 tilts. Therefore, any deflection of the spring 42 under overload thrust conditions, whether the overload is sustained or is a shock load, would cause the support disk 34 to tilt somewhat relative to the adjusting screw 22, but, nevertheless, all three of the rocker arms 33a, 33b and 33c would remain equally loaded. By this construction, therefore, a relatively simple, deflectable mounting is provided for the segments 28 without relatively complicated spring mountings for all of the thrust pads.

When such a deflection due to an overload on the shaft 13 occurs it will normally cause binding of the parts in the unit being driven by the motor 10, such binding normally overloading the motor and causing an overload protector of the motor to trip. In addition, a friction loading device may be provided for quickly causing the shaft 13 to come to a stop in the event of a thrust overload. Such a device, for example, may comprise a member 50 secured to the lower end of the shaft 13 and a friction pad 51 secured to the support disk 34 just below the member 50. The member 50 may be hardened metal and the pad 51 may be brake material, for example. In the event of a sustained overload, the member 50 and the pad 51 are forced together because of deflection as described above, and the frictional engagement overloads the motor and trips the overload protector.

To prevent the support disk 34 and the segments 28 mounted thereon from rotating with the disk 26 and the shaft 13 during operation, a radially inwardly extending rib 48 may be formed on the inner periphery of the housing 17, the rib 48 extending into a slot or indentation 49 formed in the outer periphery of the support disk 34, as shown in FIG. 3.

Figure 5:
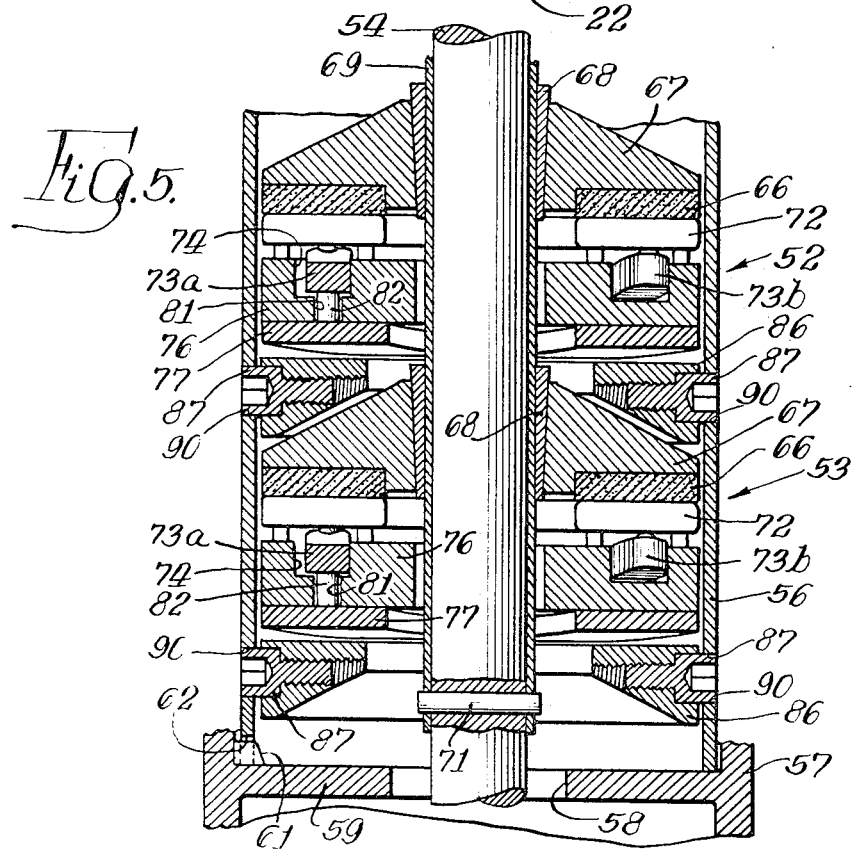
FIG. 5 is a fragmentary sectional view showing an alternate form of a bearing embodying the invention, the view being taken on the line 5—5 of FIG. 7.
Figure 6:
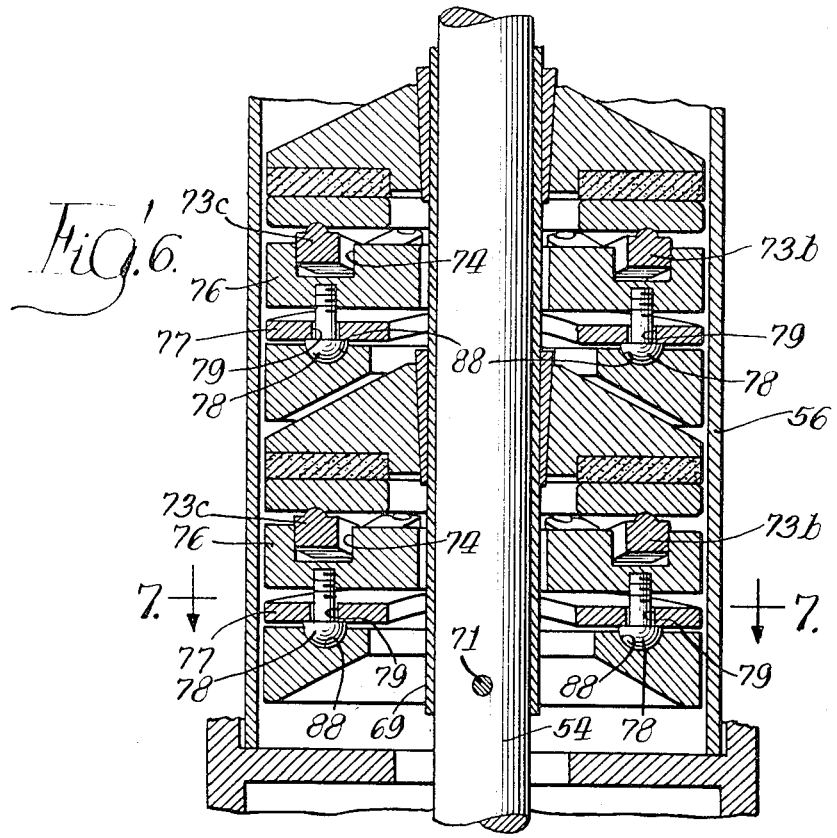
FIG. 6 is a sectional view taken on the line 6—6 of FIG. 7.
Figure 7:
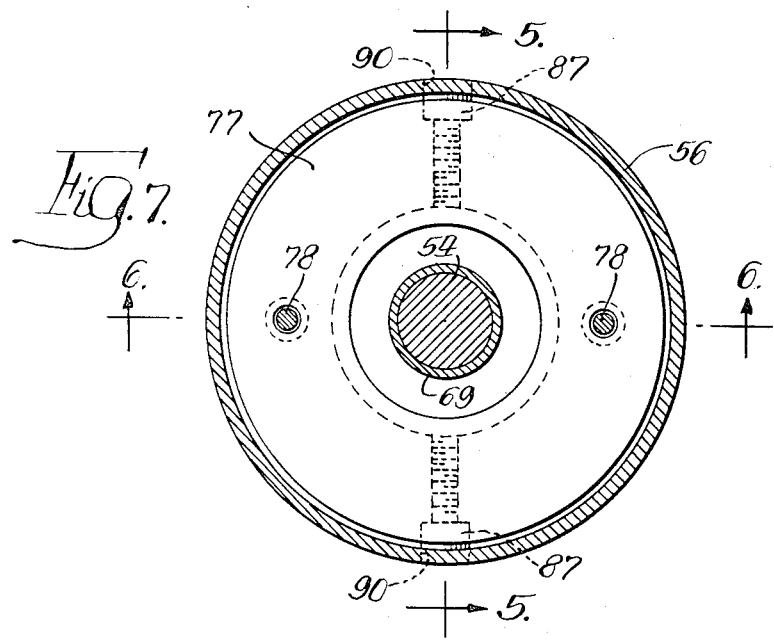
FIG. 7 is a sectional view taken on the line 7—7 of FIG. 6.

FIGS. 5 through 7 illustrate a thrust bearing including a plurality of thrust bearing units, rather than a single unit as in the above described form of the invention, and each unit includes an improved gimbal construction. The improved gimbal or pivotal construction is advantageous because the element of each thrust bearing unit which is attached to the housing, must be freely pivotable because such pivotal movement is required during overload conditions as previously explained.

The thrust bearing shown in FIGS. 5 through 7 comprises two thrust bearing units 52 and 53 which connect a rotatable shaft 54 to a stationary tubular housing or frame 56. The housing 56 forms part of the thrust bearing and is mounted on a tubular stationary support 57 which has a transverse wall 59 formed therein and a hole 58 is formed through the wall 59. The lower end of the housing 56 is positioned on the upper surface of the wall 59 and the shaft 54 extends through the wall 58. To prevent the housing 56 from rotating relative to the support 57, a rib 61 may be formed on the support 57 at the outer periphery of the wall 59, the rib 61 being located to extend into a vertically elongated slot 62 formed in the tubular housing 56.

The two thrust bearing units 52 and 53 may be identical and are generally similar to the thrust bearing unit shown in FIGS. 1 through 4. Each of the units 52 and 53 comprises a rotatable element in the form of a graphite disk 66 which is attached to a thrust disk 67, each thrust disk 67 being secured to the shaft 54 by means of a sleeve type wedge 68 as previously explained. A sleeve 69 is preferably interposed between the shaft 54 and the wedges 68, and pin 71 is provided to secure the sleeve 69 to the shaft 54.

The non-rotating element of each unit comprises a plurality of pivoted segments or pads 72, each pair of the pads 72 being supported by a rocker arm. Again, each unit includes three rocker arms 73a, 73b and 73c, the three rocker arms being positioned in a channel 74 formed in the upper surface of a support disk 76. A spring 77, such as a wave type spring, is secured to the under side of a support disk 76 by two screws 78 (FIG. 6) in the manner previously described. The spring 77 has two high points and two low points, and the screws 78 extend through holes 79 extending through the spring 77 at the low points thereof and are threaded into the underside of the support disk 76 sufficiently far to force the high points of the spring 77 against the underside of the disk 76 and thereby preload the spring 77. At one of the two high points of the spring 77, which is located directly under the center of the rocker arm 73a, a hole 81 (FIG. 5) is formed through the support disk 76 from the bottom of the channel 74 to the under side of the disk 76, and a pin 82 extends through the hole 81, the pin 82 resting on the upper surface of the spring 77 and the rocker arm 73a resting on the upper end of the pin 82.

Each support disk 76 is pivotally mounted on the housing 56 by a pivot ring or disk 86, the heads of the two screws 78 which connect the support disk to the pivot ring, and two screws 87 which connect the ring to the housing. Each pivot ring 86 is positioned under the associated spring 77 and support disk 76, and spherical depressions 88 (FIG. 6) are formed in the upper surface of the ring 86 immediately below the two screws 78, the heads of the screws 78 being rounded and positioned in the depressions 88. Thus, the support disk 76 may pivot along one horizontal axis which extends through the depressions 88 and the screws 78.

The other axis of each gimbal pivotal arrangement is formed by the pair of screws 87 which extend through holes 90 formed through the housing 56 and are threaded into holes formed in the pivot rings 86. As shown in FIG. 5, the screws 87 have cylindrical heads and the screws 87 are threaded into the pivot rings 86 sufficiently far that the heads of the screws 87 engage the edges of the housing 56 in the holes 90, the heads of the screws 87 thus acting as pivot pins for supporting the pivot ring 86.

As shown in FIG. 7, the screws 87 are diametrically opposite each other and are spaced 90° from adjacent screws 78. Thus, each pivot ring 86 may pivot on one axis formed by the screws 87 while each support member 76 may pivot about another axis formed by the screws 78, these two axes being perpendicular to one another. The thrust bearing units may be assembled on the shaft and in the housing 56, for example, by first fastening the pivot ring 86 of the lower thrust bearing unit 53 to the housing 56 using the screws 87 then positioning an assembly comprising the support disk 76, the rocker arms 73a through 73c, the pin 82, the segments 66, and the spring 77 on the ring 86, then sliding the graphite disk 66 and the thrust disk 67 downwardly along the shaft 54 until the graphite disk 66 engages the pads 72 and then rigidly securing the thrust disk 67 to the shaft 54 by means of the wedge 68. Thereafter, the parts of the upper thrust bearing unit 52 may be assembled to the housing 56 and the shaft 54 in a similar manner.

As previously described, the springs 77 of the two thrust bearing units 52 and 53 are preloaded, the deflection characteristics and the amount of the preload of each spring 77 being substantially as described with regard to the spring 42, and under normal operating conditions, the two springs 77 are not deflected. However, if the thrust exerted by the shaft 54 exceeds the combined preload of the two springs 77, the two springs will simultaneously deflect and the support disks 34 will pivot slightly on their supports. As previously explained with regard to the form of the invention shown in FIGS. 1 to 4, the shaft 54 will accordingly shift downwardly slightly into contact with a stationary friction member such as the member 54 and thereby stop rotation of the motor, or some other part of the motor or the device driven by the motor, may bind and cause the overload switch of the motor to trip.

If, for any reason, one of the two thrust bearing units 52 and 53 tends to assume a greater proportion of the thrust load than the other thrust bearing unit, that thrust bearing unit will nevertheless not be able to assume more than the preload of its spring 77. When the preload is exceeded, the spring of that unit will deflect slightly and its support block will pivot somewhat causing a slight shift of the shaft 54, resulting in a transfer of the amount of the overload to the other thrust bearing unit. The first mentioned thrust bearing unit would then operate at its full rated load, which is substantially equal to the preload, and, eventually, parts of this thrust bearing unit would probably wear sufficiently to permit the other thrust bearing unit to assume a greater proportion of the load.

From the foregoing, it will be apparent that a novel and useful thrust bearing has been provided. The assembly includes means for absorbing shock or sustained thrust overloads without damage to the thrust bearing assembly and for dividing the thrust among a number of units, and an improved gimbal mounting arrangement for the thrust bearing, the gimbal mounting arrangement being such that there is little resistance to pivotal movement of portions of the thrust bearing unit. A thrust bearing unit in accordance with the invention is advantageous because, under normal operating conditions, it will prevent the shaft from deflection axially until an overload occurs, and thereafter the amount of deflection will be relatively large for the amount of the overload. The foregoing is accomplished by a relatively simple construution which provides for both spring deflection and pivotal movement of one portion of each thrust bearing unit. When the invention is applied to a multiple thrust bearing, the springs also serve to divide the load among the several thrust bearing units.

I claim:

1. A thrust bearing adapted to support a rotatable thrust imposing member on a non-rotatable support member, comprising at least one thrust bearing unit, said unit comprising a rotatable element and a non-rotatable element, first connecting means for connecting said rotatable element to said rotatable member, and second connecting means for connecting said non-rotatable element to said support member, one of said first and second connecting means permitting the associated element to deflect relative to the associated member when a thrust load is imposed on its associated element, such deflection adapted to cause said members to deflect relative to each other, said one connecting means engaging its associated element at a plurality of spaced points and including spring means for resiliently engaging said associated element at one of said points, and pivotal means for pivotally mounting said associated element on said associated member.

2. Apparatus as in claim 1, wherein said one connecting means further includes means for preloading said springs means, the amount of said preload being substantially equal to the maximum thrust load which may be safely applied to said thrust bearing.

3. Apparatus as in claim 1, wherein said one connecting means comprises a support disk adapted to be pivotally connected to the associated member, not more than three rocker means supporting said element on said support disk at said plurality of spaced points, said spring means being interposed between said support disk and one of said rocker means.

4. Apparatus as in claim 3, wherein said spring means comprises a wave-type spring having at least two portions adjacent said support disk and at least two other portions spaced from said support disk, said rocker means being connected to said spring means at one of said adjacent portions.

5. Apparatus as in claim 3, wherein said pivotal means comprises a pivot ring positioned adjacent said support disk, first pin means extending radially from said pivot ring and connecting said pivot disk to said associated member, said pin means forming a first axis of a gimbal, second pin means connecting said pivot ring to said support disk, said second pin means forming a second axis of said gimbal and said first and second axes being substantially perpendicular to each other.

6. Apparatus as in claim 5, wherein said second pin means also secures said spring means to said support disk.

7. Apparatus as in claim 1 and further including friction means adapted to be attached to each of said members, said friction means normally being spaced apart but being adapted to be forced together when said members deflect relative to each other.

8. A thrust bearing adapted to support a rotatable thrust imposing member on a non-rotatable support member, comprising a rotatable element and a non-rotatable element, said rotatable element being adapted to be connected to said rotatable member, and connecting means for connecting said non-rotatable element to said support member, said connecting means comprising a pivot disk positioned adjacent said support member, pin means extending radially of said pivot disk and connecting said pivot disk to said support member for pivotal movement on one axis, means connecting said pivot disk with said non-rotatable element for pivotal movement of said non-rotatable element on a second axis, said pivot disc connecting means including a spring for resiliently supporting said non-rotating element, said first and second axes being substantially perpendicular to each other, said support member including a wall encircling said pivot disk, said pin means extending through said wall and engaging said pivot disk to pivotally connect said pivot disk to said wall of said support member.

9. Apparatus as in claim 8, wherein said wall of said support member is generally tubular and encloses said bearing.

10. A thrust bearing adapted to support a rotatable thrust imposing member on a non-rotatable support member, comprising a rotatable element and a non-rotatable element, said rotatable element being adapted to be connected to said rotatable member, and connecting means for connecting said non-rotatable element to said support member, said connecting means comprising a pin support adapted to be supported by said non-rotatable support member, a pivot disk positioned adjacent said pin support, pin means extending radially of said pivot disk and connecting said pivot disk to said pin support for pivotal movement on one axis, a support disk positioned adjacent and substantially coaxially with said pivot disk and connected to support said non-rotatable element, and projections formed on one of said disks and engaging the other of said disks for connecting said disks for pivotal movement on a second axis, said first and second axes being substantially perpendicular to each other, said pin support being generally tubular and enclosing the other parts of said bearing, said pin means comprising two screws each having a cylindrical head, said screws being threaded into the periphery of said pivot disk and said heads being received in holes formed in the wall of said tubular pin support.

References Cited

UNITED STATES PATENTS

| | | | |
|---|---|---|---|
| 676,471 | 6/1901 | Pessano | 308—172 |
| 3,061,384 | 10/1962 | Schaefer | 308—160 |
| 3,272,571 | 9/1966 | Ott | 308—26 |

MARTIN P. SCHWADRON, *Primary Examiner.*

FRANK SUSKO, *Assistant Examiner.*